Feb. 13, 1962     E. C. HUNGATE     3,020,974
APPARATUS FOR TREATING AIR
Original Filed April 2, 1956
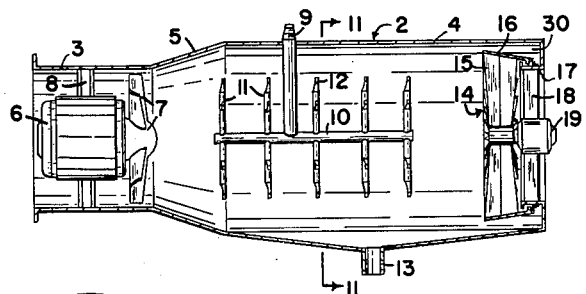
FIG. 1
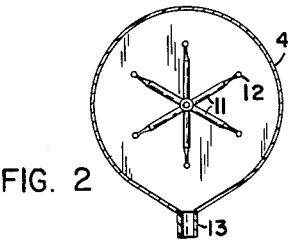
FIG. 2
FIG. 3
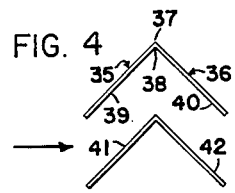
FIG. 4
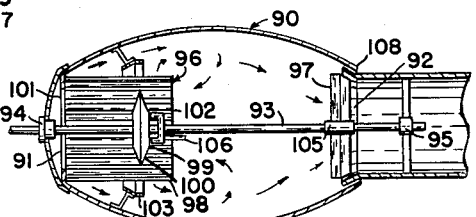
FIG. 5
INVENTOR.
ERNEST C. HUNGATE.
BY *Herman Seid*
ATTORNEY.

United States Patent Office 3,020,974
Patented Feb. 13, 1962

3,020,974
APPARATUS FOR TREATING AIR
Ernest C. Hungate, Liverpool, N.Y., assignor to Carrier Corporation, Syracuse, N.Y., a corporation of Delaware
Original application Apr. 2, 1956, Ser. No. 575,560, now Patent No. 2,932,360, dated Apr. 12, 1960. Divided and this application Jan. 28, 1960, Ser. No. 5,224
5 Claims. (Cl. 183—22)

This application is a division of my copending application, Serial No. 575,560, filed April 2, 1956, now Patent No. 2,932,360, issued April 12, 1960, entitled Apparatus for Treating Air, and relates to an apparatus for treating air of the type generally used in air conditioning and air washing systems in which the air stream is placed in direct contact with water by discharge of water into the air stream as it moves through the apparatus.

Heretofore, apparatus for treating air with water as generally utilized in industrial applications have been severely restricted in operating velocities due to the configuration of the eliminators employed in the apparatus. Eliminators are normally used to remove entrained water particles from the air stream before its discharge from the apparatus. The eliminators usually employed consist of a plurality of stationary blades having a general saw-tooth cross-section which provide zigzag paths through the eliminators. These eliminators are not effective at velocities below or above a certain critical range. In textile applications, for example, the problem is further aggravated by the presence of lint in the air stream. Lint in the air stream passing through the apparatus is moistened and clings to the surface of the eliminators requiring frequent removal and cleaning of the eliminators.

The chief object of the present invention is to provide a versatile apparatus for treating air over a wide range of air velocities including high air velocities.

An object of the present invention is to provide a self-cleaning apparatus for treating air which will remove lint and dirt particles from the air stream.

A further object is to provide a rotating eliminator which will satisfactorily remove liquid and foreign particles from a high velocity gas stream.

A still further object is to provide an eliminator that is self-cleaning. Other objects of the invention will be readily perceived from the following description.

This invention relates to an apparatus for treating air which comprises a casing having a circular air intake and a discharge opening. A double inlet centrifugal fan is mounted adjacent to and concentric with the air intake. The fan has a hub with a conical surface. A ring is concentrically mounted about the fan. The fan induces air through the air intake and an inlet of the fan into the vicinity of the ring. Means are provided for supplying water to the conical surface of the hub whereby the rotation of the fan will impinge water against the ring to cause the water to break into finely divided particles. The fan recirculates air from the casing through the second inlet into the vicinity of the ring. Means are provided for removing water from the casing. A rotary eliminator is situated adjacent the discharge opening for removing water from the air. The rotary eliminator consists of a rotatably mounted hub having a plurality of blades radially extending therefrom. The blades each have a first and a second planar member intersecting at a line drawn radially from the hub thereby giving the blade a generally V-shaped cross-section.

The attached drawings illustrate a preferred embodiment of the invention in which:

FIGURE 1 is a sectional view of the apparatus of the present invention;

FIGURE 2 is a sectional view of the apparatus taken along the line II—II of FIGURE 1;

FIGURE 3 is an enlarged fragmentary view of the eliminator as shown in FIGURE 1 showing details of the eliminator structure and the seal;

FIGURE 4 is a cross-sectional view taken on a plane looking toward the hub of the eliminator of a modified blade structure which may be utilized in the apparatus as shown in FIGURE 1; and FIGURE 5 is a sectional view of a modification utilizing a centrifugal fan to circulate air through the apparatus.

Referring to the drawings, there is shown in FIGURE 1 apparatus for treating air embodying the present invention. This apparatus includes a casing 2 having a first cylindrical section 3 and a second cylindrical section 4 which is of a greater diameter than the first section 3. A transition section 5 connects the first section 3 to the second section 4. The shape of this transition section 5 is of a general frusto-conical nature with a gradual change in cross-sectional area provided to supply a diffusing action which will be described hereinafter. Concentrically located within the first section 3 is a fan-motor 6 having blades 7 adapted to induce an air stream into said first section and into the second section 4. This fan-motor is mounted in the first section 3 by means of suitable pipe struts 8. As previously set forth, the second section 4 is of a general cylindrical shape with a sloped bottom in which is centrally located a drain 13, the function of which will be hereinafter described.

Extending into the second cylindrical section 4 is a suitable water supply line 9 which is connected to the header 10. This header 10 extends concentrically in the second section 4 and has extending therefrom suitable banks of branches 11; the ends of these branches are provided with suitable modulating nozzles which may be of the type disclosed in my copending application Serial No. 490,170, filed February 23, 1955, now abandoned.

Referring to FIGURE 2 there is shown a cross-section of the second cylindrical section 4 taken along the line II—II which discloses that each bank of branches comprises six branches 11 which are preferably spaced at approximately equal angular intervals. Referring again to FIGURE 1, it is seen that this particular embodiment utilizes five banks of branches; it is apparent that the number or orientation of branch lines and nozzles may take many different forms depending upon the shape of the second section 4 and the type of modulating nozzle utilized.

At the end of the second cylindrical section 4 as shown in FIGURE 1, there is an opening defined by the inwardly extending flange section 17. Centrally located within this opening is a suitable motor 19 which is supported in a central position by means of suitable struts 18. Extending from this motor, is a suitable shaft having an eliminator 14 mounted thereon having suitable blades 15 and enclosing means 16.

FIGURE 3 is an enlarged fragmentary view of the eliminator and the end section of the second cylindrical section 4. As shown a shaft 23 extends from the bearing 20. It will be remembered that a motor may be utilized instead of the bearing 20, as shown in FIGURE 1. Extending from the bearing 20 is a suitable shaft 23 which is rigidly connected to a hub 24. Blades 15 extend from hub 24. FIGURE 4 is a cross-sectional view of the individual blades which extend radially from the hub 24. Enclosing this radial blade structure is a suitable enclosing means 16 which in the present embodiment is shown as a frusto-conical member having an inner surface 25. This frusto-conical surface extends beyond the periphery of the bladed structure and has extending therefrom a suitable flange 26 which is an annular shaped member having its outer periphery attached to the frusto-conical surface 16 and having its plane lie normal to the axis of rotation of the hub 24.

Referring now to the construction of the flange 17 which as previously mentioned is attached to the casing 4, there are shown two parallel annular members 27 and 28 which are in spaced relationship. The inner circumference of the annular members is rigidly attached to the flange 17 thereby providing an annular channel 29 about the flange. FIGURE 3 shows that the annular member 26 mounted on the enclosing means 16 of the eliminator extends into this channel 29. The portion of the flange 17 with the annular members 27 and 28 in cooperation with the annular member 26 and the adjacent portion thereto of the enclosing means 16 constitutes a seal which will be described hereinafter.

Referring to FIGURE 4, there is shown a cross-section of two blades of the type utilized in the eliminator shown in FIGURES 1 and 3. As can be seen from FIGURE 4, this blade construction comprises two planar members 35 and 36 which are angularly disposed and intersect at juncture 37 which extends radially from the hub 24 to the enclosing means 16. The line of intersection between the first and second planar members which constitute the blade preferably lie in a plane which is normal to the axis of rotation.

Apparatus of the type described basically may carry out a heat transfer process which will result in the humidification or the dehumidification of the air stream depending upon the relative conditions of the air stream and water utilized. This process may be accompanied by an air cleaning process in which the water moistens particles in the air stream causing them to pass out of the drain of the apparatus.

To effectively humidify or dehumidify an air stream by placing water in direct contact with the air stream it is necessary that the water be broken up into very many finely divided particles or droplets, thus providing adequate surface area between the air and the water discharged therein to facilitate evaporation of the water spray or the condensation of moisture from the air by a rapid transfer of heat from one to the other. The rate of heat transfer may be increased by reducing the resistance of the film co-efficient of the surface of the droplets so that under some circumstances recirculation or turbulence of the air stream may be provided. The problem of effectively removing particles or droplets of water entrained in the air stream after the heat transfer process is critical.

As previously mentioned it is common practice to employ stationary eliminator plates in an attempt to remove entrained droplets from the air stream; as previously disclosed these stationary plates provide a plurality of zigzag paths through which the water laden air stream flows. As the laden air stream passes along these paths, the continual change in direction causes the water to impinge upon the various surfaces of the many plates, at least some of the water droplets collecting thereon and being removed from the air stream. This water drains from the eliminator by gravity into a suitable collecting means located beneath the eliminator plates.

Because of the stationary nature of this type of eliminator the velocity with which the air stream passes through the eliminator and consequently through the apparatus, is very critical so that the range of operating velocities available is very limited. Velocities above this narrow range will result in discharge from the apparatus of treated air carrying entrained water particles. Velocities below this critical range do not cause sufficient impingement and therefore permit the water to carry through the eliminator structure. In either case the operation is wholly unsatisfactory. Since many of these units are used in textile mills the undesirability of water droplets falling upon the equipment and material being processed will be readily appreciated.

In the air treating apparatus of the present invention as indicated in FIGURE 1, air is drawn into the casing 2 by the fan 6 and passes this air into the transition section 5 and then into the main section of the second cylindrical section 4. It is apparent that the air as it travels about the fan motor 6 and through the blades 7 is traveling at high velocities. The gradual increase in cross-section of the transition section causes a diffusing action as the air passes into the second cylindrical section 4. In cylindrical section 4, water at a suitable temperature, depending upon whether humidification or dehumidification is being carried on within the apparatus, is passed from the line 9 into the header 10 and through the various branches 11 and emitted by the various modulating nozzles 12 to form a fine spray within the second cylindrical section 4.

This fine spray is put into direct heat exchange relation with the air passing through this section and either humidification or dehumidification occurs depending upon the relationship of the entering air dew point with respect to the spray water temperature. The air discharged from the apparatus is at a desired temperature and desired dew point. It will be appreciated that the absolute humidity of the air leaving the unit may be less than the incoming air because of the physical fact that the ability of the air to retain moisture decreases as its temperature drops. Therefore, heat transfer between chilled water, for example, discharged into the air stream may result in the precipitation of water from the air since the decrease in temperature will result in a decrease in the capacity of the air to retain the moisture.

It will be readily perceived that humidification may also occur; in such case the temperature of the incoming air and the spray water will cause part of the spray water to evaporate, adding to the air moisture content and increasing its humidity.

Passage of the air stream through the water sprays entrains particles of water. In prior equipment, the velocity with which the air stream left the equipment was critical due to the manner in which the stationary eliminator functioned to remove entrained water particles in the air stream and their dependence upon gravity to carry the water from the eliminator surfaces after the water had impinged thereon. In the present invention a novel eliminator of a rotating type is provided in which the entrained water particles impinge upon a plurality of rotating blades as the air stream is discharged from the apparatus. Blades remove the droplets from the air stream and return the water to the apparatus.

The theory of operation of a rotating eliminator primarily resides in an impingement process. Air is induced axially into the rotating blade structure which comprises the eliminator. This air may be in a near saturated condition and include water particles entrained in the air stream. As the air enters the zone in which the rotating blades travel, the particles of water in the air change direction and impinge against the rotating blade structure. The water collects upon the surface of the blades and because of the rotation of the blades, tends to be expelled outwardly due to centrifugal action.

It is appreciated that the air and water will be subject to the influence of centrifugal force and also the forces driving the air stream through the apparatus and axially through the eliminator.

To assist the blades in their eliminating action, means are provided which will at least partially enclose the periphery of the eliminator. With such a construction the air under the partial influence of centrifugal force may create a high pressure area about the periphery of the eliminator beneath the enclosing means. This pressure is relieved by the passage of air axially through the blades. Water particles however are forced outwardly and are permitted to collect at the enclosing means where the water may be further joined by the water collected at the seal and returned to the apparatus. Because of the conical surface of the enclosing means of the embodiment shown in FIGURE 1 centrifugal force will urge this collected water to flow outwardly along the conical surface until the water is passed back into the apparatus.

Referring to FIGURE 4 air laden with water particles enters the blade structure in the direction of the arrow. In the case of the eliminator indicated in FIGURE 1, the motor may drive the eliminator structure in either direction; considering first, the motor driving the blades in a counterclockwise (downward) direction, air may first impinge against the surface 41 of the planar member 35. In such a case a particle of water will impinge upon this surface 41 and because of the rotation of the eliminator blades will be cast outwardly by centrifugal force. Simultaneously particles of water collecting upon surface 41 may travel to the juncture 37 at which point the tendency will be for the droplets of water to fall from this edge and leave this blade structure for the adjoining blade structure and fall upon the surface 40 of the planar member 36 of the adjoining blade. Because of the counterclockwise (downward) motion of the blades, the deflective action of the surface 40 which is angularly disposed with respect to the rotation of the blade structure will cause a deflective force to urge the water particle in the direction of the crevice 38. Since this crevice extends radially, particles of water captured therein will be cast outwardly to the enclosing means and thence back into the apparatus.

Consider a particle of water which is struck by the rotating eliminator and comes into contact with the surface 39 of the planar member 35. In such a case the particle of water is simultaneously acted upon by the centrifugal forces induced by the rotation of the eliminator and by the deflective forces of the angularly disposed surface 39 which will cause the water particle to flow downwardly to the crevice 38 and mingle with the water collected on the surface 40 and return to the apparatus.

Considering now operation wherein the blades shown in FIGURE 4 travel in a clockwise (upward) direction, water particles carried into the eliminator structure will impinge upon the rotating surface 41 of each blade. As the particle of water impinges thereupon it will be subject to centrifugal action which will cast the particle outwardly toward the enclosing means. Simultaneously there will be induced upon the water particle a deflective action caused by the angular disposition of the surface 41. Since the blade structure is moving in a clockwise (upward) direction the deflective action will cause the particle of water to flow outwardly towards the edge of the blade, away from the juncture 37. In such case there will be no tendency of the water to bypass the intersection of the members 35 and 36 and water will flow directly from the surface 41 to the enclosing means and back into the apparatus. In this embodiment the members 36 of each blade member will be utilized in a deflecting capacity. It will be apparent that as the air passes through the structure, it is passing in a relatively upward position and in order to counteract this direction, the surface 40 deflects the air stream and changes its direction to cause the air to flow from the eliminator structure in a general axial direction rather than in a direction which is substantially normal to the axial air flow through the structure.

FIGURE 4 illustrates the basic V cross-section of blade. Considering this basic V cross-section to be traveling in a counterclockwise (downward) direction with particles of water collecting in the crevice 38 formed by the intersection of members 35 and 36, it will be appreciated that a droplet of water on the surface 40 will be subjected to both centrifugal forces and forces which will tend to carry the droplet along the surface and out of the eliminator. This latter force is the force due to the velocity of the air traveling through the eliminator structure.

Considering FIGURE 4, it will be seen that a droplet of water landing on the surface 40 of member 36 will be subject to centrifugal force. Following a particle of water on the surface, if the particle is driven outwardly by centrifugal force, it will tend in most cases to intersect the juncture 37 of the first and second planar members 35 and 36. In such a construction a situation wherein the velocity forces outweigh the deflective forces acting on water particles on the surface 40, centrifugal action is utilized to maintain the eliminator efficiency. The basic V may be changed to vary the various angles between the members employed, the length of the various planar members may be varied to obtain certain results and certain radially extending protuberances and channels may be incorporated therein without leaving the scope of the present invention.

Referring to FIGURE 3, it can be seen that the water collected upon the blades of the eliminator is sent to an enclosing means 16. Recalling the operation of the eliminator it will be remembered that it is intended to utilize the pressure difference across the eliminator to pass the air therethrough and simultaneously the enclosing structure is intended to provide means for removing the water from the eliminator. Though it is not necessary, it has been found preferable to incorporate the enclosing means into the rotating eliminator structure. In the eliminator illustrated in FIGURES 1 and 3, this enclosing means comprises a conical surface concentrically mounted on the eliminator structure. In operation as water flows outwardly along the eliminator blade structure, it reaches the enclosing means at which time these droplets of water collect and because of centrifugal action are returned to the apparatus. Referring to FIGURE 3, this is accomplished by having the conical member converge in the direction of air flow through the eliminator. This provides a conical member which is expanding into the second cylindrical section 4 of the apparatus. As previously mentioned, particles of water on the conical surface will be urged outwardly and because of the increase in diameter of the enclosing means in the direction of the spray chamber, the particles of water will be urged in substantial counterflow to the air flow passing through the eliminator, and in this manner the water is returned to the apparatus.

Recognizing the existence of two rotating members in the apparatus, a natural arrangement in certain circumstances is to mount the air stream inducing means and the eliminator on a common shaft in a manner as shown in the embodiment of FIGURE 5. Carrying this integrating step further, a single composite blade structure may be formed to perform the air inducing and eliminating functions. It will be readily perceived in view of the aforementioned teachings that such a construction is within the scope of the present invention.

As previously described there is a seal construction associated with the conical enclosing means and the flange 17 of the cylindrical section 4. Because of the fan inducing air into the apparatus and the diffusing action of the transition section 5, there is a static pressure built up within the second section 4. Since there is a difference in static pressure between the second section 4 and the exit duct from the apparatus, this difference in pressure causes the air stream to pass through the eliminator structure. Because of the rotative nature of the eliminator and the stationary nature of the apparatus, some slight space exists between the eliminator and the apparatus. Considering also that there is a resistance to air flow through the eliminator, it is appreciated that air laden with water will attempt because of the aforementioned pressure difference to pass through this space between the eliminator and the casing. Under some circumstances this blow-by may undermine the effectiveness of the eliminator. To overcome the passage of water particles through this space, there has been devised a sealing structure which operates on a similar principle to the eliminator employed in the apparatus.

Referring to FIGURE 3 there is shown the previously described plurality of spaced annular members. As air laden with water under the influence of the static pressure attempts to bypass the eliminator it enters the space between the annular members 26 and 28, particles of water impinging on the annular members 26 and 28 previously mentioned, will be urged outwardly by centrifugal force, passed along the extended surface 25 of the conical member 16 and back into the apparatus. Water which may be carried by the air stream into the annular channel 29 will pass radially outward because of the change in direction within the seal and water will either collect on the second side of the annular member 26 or along the surface 25 of the enclosing means. Any water which collects on annular member 26 will be urged outwardly by centrifugal action and join the water collected on the surface 25 where this water will then continue along the surface 25 and join the water which passed from the eliminator blades onto the enclosing means and then pass back into the apparatus. Air which may pass through this torturous path provided by the seal will join air passing through the eliminator blades and pass from the apparatus. The principle of operation of this seal is not to provide a throttling action through the seal but rather to permit the water in the air stream to impinge upon the outer rotating structure and remain thereon so that the water may be directed back into the apparatus. It has been found that distances between the stationary and rotating members may be as great as ¼ of an inch without impairing the operation of this seal.

Referring to FIGURE 5, there is shown another embodiment of the present invention. The embodiment comprises a casing 90 having a general oval shape and having openings 91 and 92, at each end thereof. A shaft 93 suitably mounted upon bearings 94 and 95 concentrically passes through this casing and is driven by suitable means (not shown) adjacent opening 91 and located within the casing is a double inlet centrifugal fan 96. Adjacent the opening 92 and disposed within the casing 90 is the eliminator 97.

The centrifugal fan 96 comprises a circular configuration of blades 98 with two ends 101 and 102. The end 101 of the fan is adjacent the opening 91 and the casing 90. A hub 99 having a conical surface 100 is disposed between the ends of the fan. Adjacent the conical surface 100 is a water distributing means 106 and an impingement ring 103 is concentrically disposed about the fan adjacent the conical surface 100. The casing 90 is provided with a suitable drain 104 and the eliminator 97 is provided with a hub 105 which is also mounted on this shaft 93.

In operation the centrifugal fan 96 draws air through the opening 91, radially expels the air in the vicinity of the impingement ring 103 where the air is put into contact with a water spray. The water distributing means simultaneously casts water upon the surface 100 of the hub 99. Rotation of the hub centrifugally expels the water against this ring, creating the fine spray of water. The moisture laden air having entered the casing 90, is partially recirculated by passing through the end 102 of the fan 96. This recirculation of the air insures sufficient heat transfer between the water and the air. Located adjacent to the opening 92 of the casing 90 is the eliminator 97, which may be of the type illustrated and described in FIGURE 3. It can be seen that the eliminator employed in FIGURE 5 has a conical shaped enclosing means 108 which is not affixed to the eliminator and is of an alternate type suggested in the description of FIGURE 3. The casing 90 is provided with a drain 104 from which water and foreign particles in the air stream may be drained from the system.

There have been presented various modifications of the invention as utilized in an air conditioning system. However, it will be apparent that this type system may be utilized merely for its air washing capabilities. Furthermore, it is apparent that the eliminator structure can be used in applications wherein it is desired to remove liquid particles from a gas stream passing through the eliminator structure. It is also noted that the particular type apparatus disclosed with its rotating eliminators are highly commended for air and gas washing operations in which a liquid would be utilized to wash the gas stream and the eliminator would remove liquid particles from the gas stream as it leaves the apparatus and pass the liquid containing foreign particles back into the apparatus.

A characteristic of this rotating eliminator which is of particular interest is its tendency to be self-cleaning. Because of its rotational nature, forces may be exerted on the liquid particles many times greater than the gravitational action relied on in stationary eliminators so that the water and dirt particles will always be subject to centrifugal forces many times greater than any adhesive forces thereby insuring clean eliminator blades. An application for this type of apparatus with its eliminator exists in textile mills wherein not only is the air humidified but also it is cleaned by the washing action of the water. In stationary eliminators, the wet lint coats the eliminator surfaces requiring frequent and extensive maintenance. It has been found that this rotating eliminator structure is sufficiently effective to maintain itself free from wet lint.

While I have described preferred embodiments of the invention it will be understood the invention is not limited thereto since it may be otherwise embodied within the scope of the following claims:

I claim:

1. An apparatus for treating air comprising a casing having a circular air intake and a discharge opening, a double inlet centrifugal fan, said fan having a first inlet adjacent to said air intake and a second inlet remote therefrom, said fan including a hub having a conical surface between the inlets of said fan, a ring secured to said casing and concentrically mounted about said fan between the ends thereof, said fan inducing air through said air intake and said first inlet of the fan and into the vicinity of said ring, means for supplying water to said conical surface whereby the rotation of the fan will impinge water against said ring to cause the water to break into finely divided particles, said fan recirculating air through said second inlet from the casing into the vicinity of said ring, means for removing water from said casing, and a rotary eliminator situated adjacent said discharge opening, said rotary eliminator consisting of a rotatably mounted hub having a plurality of blades radially extending therefrom, said blades each having first and second members intersecting at a line drawn radially from said hub thereby giving said blades a general V-shaped cross-section.

2. An apparatus for removing entrained liquid from a gas stream comprising a casing having a circular gas intake and a discharge opening, a double inlet centrifugal fan, said fan having a first inlet adjacent the gas intake and a second inlet remote therefrom, said fan including a hub having a conical surface disposed between the inlets of said fan, a ring concentrically mounted about said fan, said fan inducing gas through said gas intake and the first inlet of the fan and into the vicinity of said ring, means for supplying liquid to impinge against said ring to cause the liquid to break into finely divided particles, said fan recirculating gas from the casing through the second inlet of the fan into the vicinity of the ring, a rotary eliminator consisting of a rotatably mounted hub having a plurality of blades radially extending therefrom for removing entrained liquid from the gas stream, and means for removing liquid from said casing.

3. In an apparatus for removing entrained water from an air stream, the combination of a casing having a first and a second opening, a double inlet centrifugal fan mounted adjacent said first opening, said fan having a first inlet adjacent the first opening and a second inlet remote therefrom, said fan having a hub disposed between the inlets of said fan, said hub having a conical surface, a ring concentrically mounted about said fan, said fan moving air through the first opening and said first inlet of the fan into the vicinity of the ring, means for supplying water to said conical surface whereby the rotation of the fan will impinge water against said ring to cause the water to break into finely divided particles, said fan recirculating air within the casing through the second inlet of said fan into the vicinity of said ring, and a rotary eliminator situated adjacent said second opening, said rotary eliminator consisting of a rotatably mounted hub having a plurality of blades extending therefrom, said blades constructed and arranged to define a plurality of axial paths, each having at least one change in direction.

4. An apparatus for treating air comprising a casing having a first opening and a second opening, a shaft rotatably disposed in said casing, a double inlet centrifugal fan on said shaft, said fan having a first inlet adjacent to said first opening and a second inlet remote therefrom, said fan having a hub disposed between the inlets of the fan, said hub having a conical surface, a ring in said casing concentrically mounted about said fan, said fan moving air into said casing through said first opening, through said first inlet, and outwardly into the vicinity of said ring, means for supplying water to the conical surface of said hub, rotation of the fan and hub causing water to be impinged against the ring and broken into a fine spray, said fan recirculating air from within the casing through the second inlet of said fan into the vicinity of said ring, a rotary eliminator mounted in said casing adjacent the second opening, said rotary eliminator consisting of a hub secured to said shaft and a plurality of blades extending substantially radially from said hub, and means for removing water collected in said casing.

5. An apparatus as in claim 4 wherein each blade has a first planar member and a second planar member, said members intersecting in a line drawn substantially radially of the axis of rotation and said blades defining a plurality of axial paths having at least one change in direction.

References Cited in the file of this patent

UNITED STATES PATENTS

| | | |
|---|---|---|
| 1,190,386 | Dickerson | July 11, 1916 |
| 1,480,775 | Marien | Jan. 15, 1924 |
| 1,511,834 | Marien | Oct. 14, 1924 |
| 1,833,674 | Fedeler | Nov. 29, 1931 |
| 1,875,711 | Dudley | Sept. 6, 1932 |
| 2,184,731 | Brewer | Dec. 26, 1939 |
| 2,195,707 | Nutting | Apr. 2, 1940 |
| 2,596,782 | Moore | May 13, 1952 |

FOREIGN PATENTS

| | | |
|---|---|---|
| 15.675/33 | Australia | Dec. 20, 1933 |